UNITED STATES PATENT OFFICE.

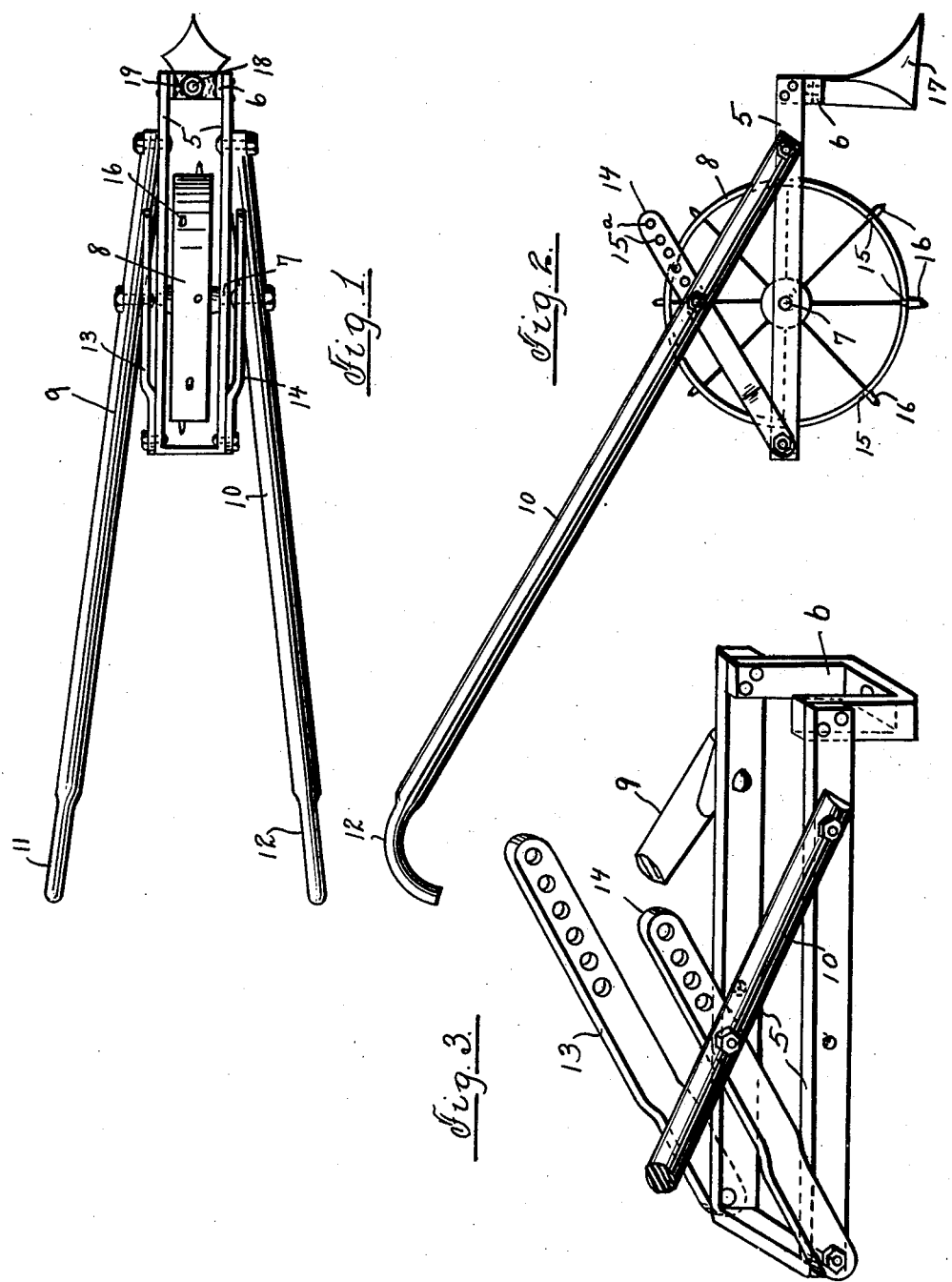

HERBERT C. MUNDY AND EDITH HARRISON, OF LOS ANGELES, CALIFORNIA.

GARDEN-TOOL.

1,313,200.  Specification of Letters Patent.  Patented Aug. 12, 1919.

Application filed June 10, 1918. Serial No. 239,142.

*To all whom it may concern:*

Be it known that we, HERBERT C. MUNDY and EDITH HARRISON, citizens of the United States, residing at Los Angeles, in the county of Los Angeles, State of California, have invented certain new and useful Improvements in Garden-Tools, of which the following is a specification.

Our invention relates primarily to a garden tool of the kind used in cultivating by hand, although it may be adapted for use in both mechanical and horse power cultivating, and the object thereof is to produce a device adapted for use with a variety of cultivating tools, which will be cheap, simple and efficient in operation and which will reduce the effort necessary to the operation of such tools to the minimum.

A further object is to produce a device of the above character which will permit of the operation of the various cultivating tools to cultivate the ground to the base of a wall, fence or the like and also to reach into corners instead of being compelled to leave a large space uncultivated as is the case with the present tools for hand cultivation.

Other objects and advantages will be obvious and while we have shown and will describe the preferred form of our invention, it will be understood that we do not limit ourselves to such preferred form but that various changes and adaptations may be made therein without departing from the spirit of our invention.

In the drawings forming a part of this application:

Figure 1 is a side elevation of our complete device.

Fig. 2 is a top plan of Fig. 1.

Fig. 3 is an enlarged detail of a portion of our device.

Referring to the drawings our device comprises a substantially U-shaped base frame 5, the closed end of which extends rearwardly or toward the operator, and the open end of which is closed by a U-shaped member 6, centrally of which is detachably mounted a downwardly depending cultivator tool 17. Mounted centrally of the long legs of member 5 transversely thereof is a carrying wheel axle 7 upon which is revolubly mounted a carrier wheel 8. Secured to the side members of member 5 at a short distance from the front ends thereof are a pair of propelling handles 9 and 10, which handles extend rearwardly and upwardly at an angle and terminate in downwardly curved hand grips 11 and 12. Pivotally secured to the outer sides of member 5 at the rear end thereof are one end of adjusting bars 13 and 14 secured thereto by bolts or other suitable means.

Bars 13 and 14 extend forwardly and upwardly from member 5 and are adjustably secured to the inner sides of handles 9 and 10 in any suitable manner, it being specifically noted that the point at which the said adjusting bars 13 and 14 are connected to the handles 9 and 10 is such that when the device is being used this point will be exactly over the center of the wheel axle, it being the prime feature of our invention that this construction equalizes or balances the load making it possible to operate the same with the minimum of effort, regardless of the hardness of the ground or the tool being used. Heretofore in the use of tools of this character the cultivating tools have been mounted at the rear of the wheel between the same and the handles and the operator was required to hold the handles elevated or depressed to regulate the depth of the furrow and also to propel the machine thereby throwing the entire load upon the hands of the operator and rendering it difficult if not impossible to regulate the depth of the furrow or cut being made. In our device by mounting the tool in front of the wheel and using the peculiar construction of the carrier frame the load is transferred to the wheel and the only effort required of the operator is to propel the device. A further advantage of our construction and mounting is that the cultivating tool may be projected up to a wall, fence or into a corner thus obviating considerable wastage of ground or hand work cultivating the places not reached by the ordinary tool. In the rim of the carrier wheel 8 we provide a plurality of screw threaded holes 15 in which are adapted to be screwed traction spurs 16 when desired or necessary.

Having described our invention what we claim is:

1. A garden tool comprising a substantially U-shaped frame mounted horizontally; handles secured at one end to said frame near the front end thereof, said handles extending upwardly and rearwardly at an angle and terminating in hand grips: a connection from the rear of said U-shaped frame to said handles, said connection being at a point in vertical alinement with the center of the wheel axle; a wheel revolubly mounted in said U-shaped frame; and a cultivating tool mounted in the front end of said U-shaped frame to extend downwardly therefrom.

2. A garden tool comprising a pair of angularly disposed handles; a U-shaped frame connected at its open end to the lower end of said handles, said open end extending forwardly from said handles; a holding member connecting the free ends of said frame; a cultivating tool mounted in said holding member; and a connection from the closed end of said frame to said handles intermediate the ends thereof, said connection being at a point in alinement with the vertical center of the carrier wheel; and a carrier wheel revolubly mounted in said frame.

3. A garden tool comprising a substantially U-shaped frame mounted horizontally with its open end extending forwardly; handles secured at one end to said frame near its open end, said handles extending upwardly and rearwardly at an angle and terminating in hand grips; a connection from the rear end of said frame to said handles, said connection being at a point in vertical alinement with the center of the carrier wheel; and a carrier wheel revolubly mounted in said frame.

4. A garden tool comprising a substantially U-shaped frame mounted horizontally; handles secured at their lower ends to said frame near its front open end, said handles extending rearwardly and upwardly at an angle and terminating in hand grips; a carrier wheel revolubly mounted in said frame transversely thereof; a connection from the rear end of said frame to said handles, said connection being at a point in vertical alinement with the center of said wheel axle; and a cultivating tool mounted in the front end of said frame.

In witness that we claim the foregoing we have hereunto subscribed our names this 29th day of May 1918.

HERBERT C. MUNDY.
EDITH HARRISON.

Copies of this patent may be obtained for five cents each, by addressing the "Commissioner of Patents, Washington, D. C."